US009245523B2

(12) United States Patent
Wasserblat et al.

(10) Patent No.: US 9,245,523 B2
(45) Date of Patent: Jan. 26, 2016

(54) METHOD AND APPARATUS FOR EXPANSION OF SEARCH QUERIES ON LARGE VOCABULARY CONTINUOUS SPEECH RECOGNITION TRANSCRIPTS

(71) Applicant: NICE-SYSTEMS LTD, Ra'anana (IL)

(72) Inventors: Moshe Wasserblat, Makabim (IL); Maya Gorodetsky, Modiin (IL); Gennadi Lembersky, Nesher (IL)

(73) Assignee: NICE-SYSTEMS LTD, Ra'anana (IL)

( * ) Notice: Subject to any disclaimer, the term of this patent is extended or adjusted under 35 U.S.C. 154(b) by 438 days.

(21) Appl. No.: 13/950,299

(22) Filed: Jul. 25, 2013

(65) Prior Publication Data

US 2015/0032448 A1    Jan. 29, 2015

(51) Int. Cl.
*G06F 17/30* (2006.01)
*G10L 15/26* (2006.01)
*G10L 15/18* (2013.01)
*G10L 15/08* (2006.01)

(52) U.S. Cl.
CPC ........ *G10L 15/1815* (2013.01); *G06F 17/3074* (2013.01); *G06F 17/30746* (2013.01); *G10L 15/26* (2013.01); *G10L 2015/088* (2013.01)

(58) Field of Classification Search
CPC .......... G06F 17/3074; G06F 17/30743; G06F 17/30746; G10L 15/26
See application file for complete search history.

(56) References Cited

U.S. PATENT DOCUMENTS

| | | | | |
|---|---|---|---|---|
| 6,112,172 A * | 8/2000 | True | ................ | G06F 17/30017 704/235 |
| 6,882,970 B1 * | 4/2005 | Garner | .............. | G06F 17/30746 704/236 |
| 8,214,210 B1 * | 7/2012 | Woods | ................ | G06F 17/3066 704/10 |
| 2002/0052740 A1 * | 5/2002 | Charlesworth | ... | G06F 17/30038 704/220 |
| 2003/0187649 A1 * | 10/2003 | Logan | ............... | G06F 17/30017 704/260 |
| 2005/0010412 A1 * | 1/2005 | Aronowitz | .............. | G10L 15/02 704/254 |
| 2005/0149516 A1 * | 7/2005 | Wolf | ................. | G06F 17/30681 |
| 2006/0206324 A1 * | 9/2006 | Skilling | ............ | G06F 17/30746 704/231 |
| 2008/0281806 A1 * | 11/2008 | Wang | ................ | G06F 17/30663 |
| 2009/0150337 A1 * | 6/2009 | Seide | ................ | G06F 17/30778 |
| 2011/0040774 A1 * | 2/2011 | Peoples | ............. | G06F 17/30746 707/765 |
| 2015/0032448 A1 * | 1/2015 | Wasserblat | .......... | G10L 15/1815 704/235 |

OTHER PUBLICATIONS

Mamou, Jonathan, and Bhuvana Ramabhadran. "Phonetic query expansion for spoken document retrieval." Interspeech. 2008.*
Allan, James. "Robust techniques for organizing and retrieving spoken documents." EURASIP Journal on Applied Signal Processing 2003: 103-114.*
Logan, Beth, and Jean-Manuel Van Thong. "Confusion-based query expansion for OOV words in spoken document retrieval." Interspeech. 2002.*

* cited by examiner

*Primary Examiner* — Samuel G Neway
(74) *Attorney, Agent, or Firm* — Soroker-Agmon (57) ABSTRACT

The subject matter discloses a method for expansion of search queries on large vocabulary continuous speech recognition transcripts comprising: obtaining a textual transcript of audio interaction generated by the large vocabulary continuous speech recognition; generating a topic model from the textual transcripts; said topic model comprises a plurality of topics wherein each topic of the plurality of topics comprises a list of keywords; obtaining a search term; associating a topic from the topic model with the search term; and generating a list of candidate term expansion words by selecting keywords from the list of keywords of the associated topic; said candidate term expansion words are of high probability to be substitution errors of the search term that are generated by the large vocabulary continuous speech recognition.

15 Claims, 4 Drawing Sheets

TOPIC DATA STRUCTURE WITHIN THE TOPIC MODEL

| WORD | STEM | FREQUENCY | PHONETIC TRANSCRIPTION | WEIGHT |
|---|---|---|---|---|
| [350] SERVICE | [360] SERVICE | [370] 547 | [380] /ʃ/ /E/ /R/ /V/ /I/ /ʃ/ / | [390] 0.95 |
| [352] PAY | [362] PAY | [372] 268 | [382] /P/ /E/ /I/ | [392] 0.82 |
| [354] SERVER | [364] SERVER | [374] 211 | [384] /ʃ/ /E/ /R/ /V/ /E/ /R/ | [394] 0.73 |
| ... | ... | ... | ... | |
| [356] DISCOUNT | [366] DISCOUNT | [376] 76 | [386] /D/ /I/ /ʃ/ /K/ /A/ /U/ /N/ /T/ | [396] 0.12 |

METHOD AND APPARATUS FOR EXPANSION OF SEARCH QUERIES ON LARGE VOCABULARY CONTINUOUS SPEECH RECOGNITION TRANSCRIPTS

FIELD OF THE INVENTION

The present invention relates to automatic speech recognition in general, and to large vocabulary continuous speech recognition, in particular.

BACKGROUND

Many organizations, such as commercial organizations, financial institutions, government agencies or public safety organizations conduct numerous interactions with customers, users, suppliers and the like on a daily basis. Many of these interactions are vocal, or at least comprise a vocal or audio component, for example, voices of participants of a phone call or the audio portion of a video or face-to-face interaction.

Many organizations record some or all of the interactions, whether it is required by law or regulations, for quality assurance or quality management purposes, or for any other reason.

Once the interactions are recorded, the organization may want to extract as much information as possible from the recorded interactions. A common way to extract information from the interactions relates to speech recognition and in particular to searching for particular words uttered by the participants of the interactions. The searched words may be product names, service names, competitor names, competing product names, or the like. The words may be searched on textual transcripts that are generated by applying Large Vocabulary Continuous Speech Recognition (LVCSR) on the vocal interactions. A common metric of the quality performance of an LVCSR system is word error rate (WER). The WER is calculated by comparing between LVCSR transcripts and manual transcripts of a collection of vocal interactions. The WER is defined as the sum of word substitutions, word insertions and word deletions in the LVCSR transcripts, divided by the total number of words in the manual transcripts. The WER of conversational speech transcripts, generated by LVCSR may be as high as 30%-50%. Such high WER significantly lowers the recall of terms (words/phrases) that are searched on the said textual transcripts.

In order to enhance the recall of searched terms over LVCSR transcripts, there is a need in the art for a method and apparatus for expansion of search queries on textual transcripts that are generated by LVCSR.

SUMMARY OF THE INVENTION

The disclosure relates to method for expansion of search queries on large vocabulary continuous speech recognition transcripts comprising: obtaining a textual transcript of audio interaction generated by the large vocabulary continuous speech recognition; generating a topic model from the textual transcripts; said topic model comprises a plurality of topics wherein each topic of the plurality of topics comprises a list of keywords; obtaining a search term; associating a topic from the topic model with the search term; and generating a list of candidate term expansion words by selecting keywords from the list of keywords of the associated topic; said candidate term expansion words are of high probability to be substitution errors of the search term that are generated by the large vocabulary continuous speech recognition. The method may further comprise extracting a phonetic transcription of the search term. The method may further comprise detecting the frequency of the search term in the textual transcripts. The method may further comprise extracting phonetic transcriptions of the keywords on the list of keywords. The method may further comprise extracting the stem form of the keywords on the list of keywords. The method may further comprise detecting the frequency of the keywords on the list of keywords by counting the number of appearances of the keywords in the textual transcripts. Within the method, associating a topic from the topic model with the search term is performed by detecting keywords on the lists of keywords that are similar to the search term. Within the method, more than one keyword is detected along with a frequency of the detected keywords within each topic and wherein the search term is associated with the topic that comprises the detected keyword with the highest frequency. Within the method, more than one keyword is detected along with a weight of the detected keywords within each topic and wherein the search term is associated with the topic that comprises the detected keyword with the highest weight. Within the method, generating the list of candidate term expansion words is based on detecting phonetic similarities between the search term and the keywords within the associated topic. Within the method, the detection of the phonetic similarities comprises: comparing between the phonetic transcription of the search term and the phonetic transcriptions of the keywords within the associated topic; producing similarity scores; and comparing between the similarity scores and a predefined similarity threshold. The method may further comprise generating a list of term expansion words by selecting words from the list of candidate term expansion words. Within the method, selecting the words from the list of candidate term expansion words is performed by comparing between the frequencies of the words on the list of term expansion words and the frequency of the search term. Within the method, the frequency of a word on the list of term expansion words is the summation of all the frequencies of keywords within the associated topic that share the same stem form as the word on the list of term expansion words. The method may further comprise expanding the search term by adding the term expansion words on the term expansion words list to the search term by using logical operators between the search term and the words on the term expansion words list.

A prior art system, described in U.S. patent application Ser. No. 12/941,057 includes a method for discarding out-of-context words that appear as errors in a textual transcript. This application focuses on enhancing the recall of a retrieval task of textual transcripts based on the detection of substitution errors of words that are phonetically and semantically similar in a collection of textual transcripts.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
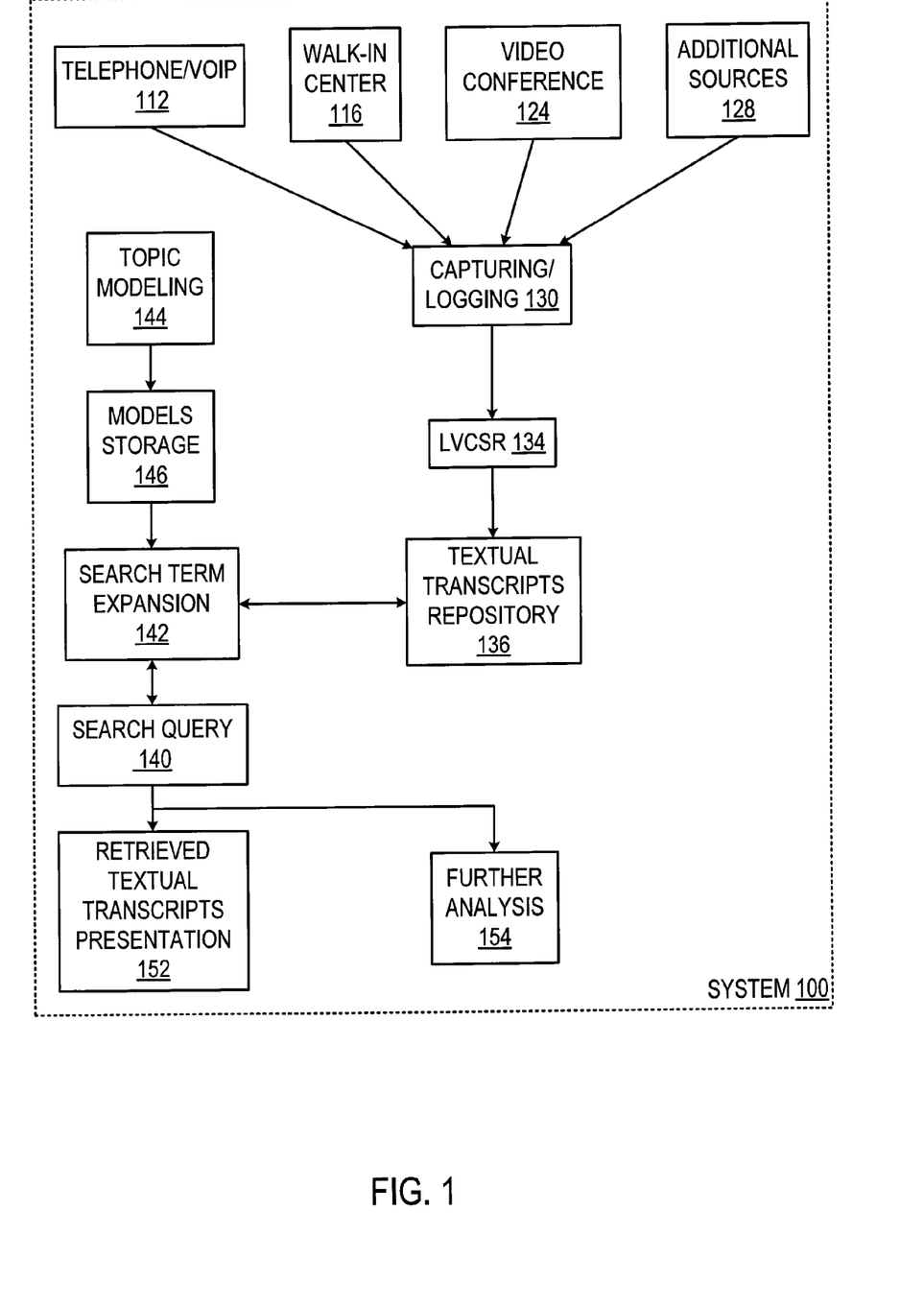
FIG. 1 shows a typical computerized environment in which the disclosed method is used, according to exemplary embodiments of the disclosed subject matter.

Reference is made to FIG. 1 that shows a typical computerized environment in which the disclosed method is used, according to exemplary embodiments of the disclosed subject matter. As shown, a system 100 may include a capturing and/or logging module 130 that may receive interactions as input from various sources as shown by a telephone/VoIP module 112, a walk-in center 116, a video conference 124 or additional sources 128. It will be understood that a capturing and logging module 130 may receive any digital representation of audio signal produced by any component or system, e.g., any recording or capturing device. For example, any one of a microphone, a computer telephony integration (CTI) system, a private branch exchange (PBX), a private automatic branch exchange (PABX) or the like may be used in order to capture audio signals. As further shown, the system may include Large Vocabulary Continuous Speech Recognition (LVCSR) component 134 that produces textual transcripts, a textual transcripts repository 136 for storing the textual transcripts, a search query component 140 for searching and retrieving the textual transcripts, a search term expansion component 142 for enhancing the quality of the retrieval of the textual transcripts, in terms of precision and recall, a topic modeling component 144 for producing models that are used for search term expansion and a models storage 146 for storing the models that are produced by the topic modeling component 144 and used by the search term expansion component 142.

As shown, the output of the search query may be provided to a retrieved textual transcripts presentation module 152 and/or to further analysis module 154.

A typical environment where a system according to the present invention may be deployed may be an interaction-rich organization, e.g., a call center, a bank, a trading floor, an insurance company or any applicable financial or other institute. Other environments may be a public safety contact center, an interception center of a law enforcement organization, a service provider, an internet content provider with multimedia search needs, a system for content delivery programs, or the like.

Interactions captured and provided to the system 100 may be any applicable interactions or transmissions, including broadcasts, interactions with customers or users or interactions involving organization members, suppliers or other parties.

Various information types may be provided as input to the system 100. The information types optionally include auditory segments, video segments, and additional data. The capturing of voice interactions, or the vocal or auditory part of other interactions, such as video, may be of any form, format, and may be produced using various technologies, including trunk side, extension side, summed audio, separate audio, various encoding and decoding protocols such as G729, G726, G723.1, and the like.

The interactions may be provided by the telephone/VOIP module 112, the walk-in center module 116, the video conference module 124 or the additional sources module 128. Audio interactions may include telephone or voice over IP (VoIP) sessions, telephone calls of any kind that may be carried over landline, mobile, satellite phone or other technologies. It will be appreciated that voice messages are optionally captured and processed as well, and that embodiments of the disclosed subject matter are not limited to two-sided conversations. Captured interactions may include face to-face interactions, such as those recorded in a walk-in-center, video conferences that include an audio component or any additional sources of data as shown by the additional sources module 128. The additional sources module 128 may include vocal sources such as microphone, intercom, vocal input by external systems, broadcasts, files, streams, or any other source.

Data from all the above-mentioned sources and others may be captured and/or logged by the capturing and logging module 130. The capturing and logging module 130 may include a computing platform that may execute one or more computer applications as detailed below. The captured data may optionally be stored in storage which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like.

The storage may be common or separate for different types of captured segments of an interaction and different types of additional data. The storage may be located onsite where the segments or some of them are captured, or in a remote location. The capturing or the storage components can serve one or more sites of a multi-site organization.

The capturing and logging module 130 provides data to an LVCSR component 134. The LVCSR component 134 may produce textual transcripts of the audio interactions or the vocal part of video or other above-mentioned sources. The word error rate of the textual transcripts generated by the LVCSR component 134 may be as high as 30%-50%. The textual transcripts repository 136 stores the textual transcripts that are produced by the LVCSR component 134. The search query component 140 enables to search and retrieve textual transcripts from the textual transcripts repository 136. The search query comprises search terms, which are words or phrases that are searched in the textual transcripts.

The search term expansion component 142 aim is to improve the quality of the retrieval of the textual transcripts in terms of precision and recall. Each search term is expanded with a list of suggested terms. The suggested terms are terms that are identified as terms with high probability to be substitution errors of the search term. The substitution errors are generated by the LVCSR component. Example for such substitution error is the word "council" that may appear in a textual transcript instead of the word "cancel" which was originally uttered by the speaker. The search term expansion is based on the detection of terms that are similar both phonetically and semantically to the search term. Phonetic similarity detection may be based on comparing the phonetic transcription of the search term with the phonetic transcriptions of other words. Semantic similarity is based on detecting the different topics discussed in a collection of textual transcripts (corpus). Semantic similarity between two words may be deduced if the two words belong to the same topic. For example, if the words "counsel" and "council" belong to the same topic as the word "cancel", then they are semantically similar in the corpus. The search term expansion component uses the topic models in order to detect terms (words/phrases)

that are semantically and phonetically similar and thus may appear as substitution errors of the search term.

The topic modeling component 144 produces the topic model that is used for x producing a topic model. The topic model is used for search term expansion. The topic modeling component 144 applies a topic detection algorithm on the corpus in order to detect the different topics discussed in the textual transcripts assembling the corpus. Semantically similar words are expected to belong to the same topic. In some embodiments, topic modeling may be based on clustering of words that appear in the corpus. The models storage 146 stores the models that are produced by the topic modeling component and used by the search term expansion.

The output of the enhanced search query, which is the retrieved textual transcripts, may be sent to the retrieved textual transcripts presentation module 152. The retrieved textual transcripts may be presented in any way the user prefers, for example, list presentation with textual snippets that serve as preview for the textual transcripts. The retrieved textual transcripts can also be presented in a dedicated user interface or media player that provides the ability to listen to certain areas of the interactions that the textual transcripts originated from.

The system 100 may include one or more collections of computer instructions, such as libraries, executables, modules, or the like, programmed in any programming language such as C, C++, C#, Java or other programming languages, and/or developed under any development environment, such as .Net, J2EE or others.

Alternatively, methods described herein may be implemented as firmware ported for a specific processor such as digital signal processor (DSP) or microcontrollers, or may be implemented as hardware or configurable hardware such as field programmable gate array (FPGA) or application specific integrated circuit (ASIC). The software components may be executed on one platform or on multiple platforms wherein data may be transferred from one computing platform to another via a communication channel, such as the Internet, Intranet, Local area network (LAN), wide area network (WAN), or via a device such as CD-ROM, disk on key, portable disk or others.

Figure 2:
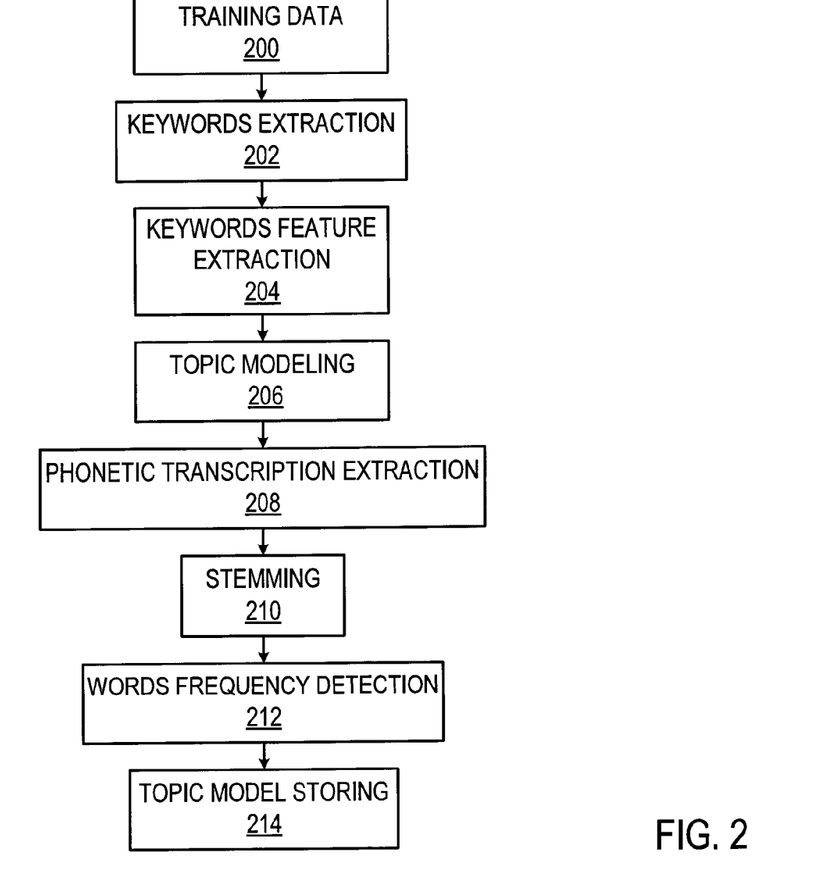
FIG. 2 shows a method for topic model generation according to exemplary embodiments of the disclosed subject matter.

Reference is made to FIG. 2 which shows a method for topic model generation according to exemplary embodiments of the disclosed subject matter. The embodiment shown in FIG. 2 may be carried out by component such as topic modeling component 144 of FIG. 1.

Step 200 discloses obtaining a training data. The training data consists of a collection of textual transcripts. Each textual transcript is an LVCSR generated transcript of audio interaction. A typical collection size may be for example, one thousand textual transcripts that originate from one thousand audio interactions of average length of five minutes.

The interactions that are used for assembling the textual transcripts collection may be a subset of a larger repository of contact center interactions. It is preferred that the interactions assembling the collection are randomly picked from the repository, in order to form a representative sample of the repository. That is, the topics that are discussed in the repository of contact center interactions are represented in the collection of textual transcripts.

In some embodiments the collection of textual transcripts may be represented by a single textual transcript that was generated by concatenating the collection of textual transcripts. In other embodiments the collection of textual transcripts may be represented by a single textual transcript that was generated by concatenating the audio interactions and producing a single LVCSR transcript from the concatenated audio interactions.

Step 202 discloses extracting keywords from the collection of textual transcripts. The keywords are extracted by generating a list of words that appear at least a predefined number of times in the collection of textual transcripts. The predefined number of times may typically be a function of a parameter of the collection of textual transcripts, such as size. For instance, the predefined number of times may be 0.005% of the total number of words in the collection.

Step 204 discloses extracting a feature vector for keywords using the collection of textual transcripts. In some embodiments, the feature extraction may be based on pointwise mutual information (PMI) of the keyword with other words in its proximity. For example, the feature vector of a keyword is produced by producing the PMI measure of the keyword with each one of its contextual words. The contextual words may be all of the words that are found within a distance of not more than five words apart from the keyword. The contextual words are extracted taking into account the entire collection of textual transcripts. Each feature vector, representing a keyword, may comprise the keyword's contextual words and their PMI score with the keyword.

Step 206 discloses topic modeling. The topic modeling is performed by applying a topic detection algorithm on the collection of textual transcripts in order to detect the different topics discussed in the collection of textual transcripts. Semantically similar keywords are expected to belong to the same topic. In some embodiments, topic modeling may be based on clustering the keywords that are represented by their associated feature vectors, wherein each cluster is considered as a different topic. The clustering method is preferably but not limited to K-means clustering. Other clustering methods such as hierarchical clustering may be used. Each topic in the topic model is represented by one cluster. Each topic consists of a list of keywords and their weights in the topic. The weight of the keyword in the topic represents its centrality in the topic. For example, the weight of a keyword may be determined by measuring the Euclidean distance between the keyword and the mean of the cluster. The list of keywords and their weights in the topic is associated with the topic. The list of keywords that is associated with the topic is a sub group of the keywords that are extracted at step 202. In other embodiments, other topic modeling methods, such as Latent Dirichlet Allocation (LDA) may be used.

Step 208 discloses extracting the phonetic transcription of the keywords on the lists of keywords that are associated with the topics. The phonetic transcription is a sequence of phonemes forming the phonetic representation of the word. The phonetic transcription may be extracted from a phonetic dictionary. A phonetic dictionary contains a map between every word in the language and its phonetic transcription. Each keyword is associated with its phonetic transcription. For example the phonetic transcription of the word 'cancel' is /k/ /a/ /n/ /ʃ/ /e/ /l/ and the phonetic transcription of the word 'council' is /k/ /a/ /u/ /n/ /ʃ/ /i/ /l/.

Step 210 discloses extracting the stem form of keywords. Stemming is performed, namely, reducing inflected or derived words to their stem, base or root form, generally a written word form, for example, detecting the base form of each word, typically a singular and present form. Each keyword is also associated with its stem form. Stemming is performed in order to enable the counting of all the inflections of the same word in a single count.

It should be understood to a person skilled in the art that stemming may be performed using proprietary tools, or any other external or commercial tools, such as LinguistxPlatform™ manufactured by SAP.

Step 212 discloses detecting the frequencies of the keywords on the lists of keywords that are associated with the topics. The number of appearances of each keyword in the transcripts collection is counted. Said count is referred to herein as the keyword frequency. The keyword frequency is associated with the keywords on the lists of keywords that are associated with the topics.

Step 214 discloses topic model storing. The topic model consists of a plurality of topics. Each topic comprises a list of keywords along with their stem forms, their phonetic transcriptions, their keyword frequencies and their weights in the topic. The topic model is stored in any permanent storage, such models storage 146 of FIG. 1.

Figure 3A:
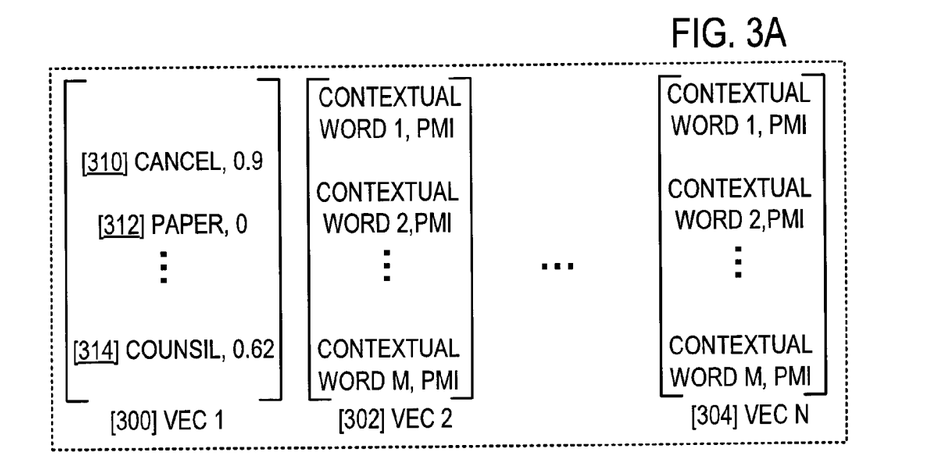
FIG. 3A shows an exemplary illustration of plurality of feature vectors data structure according to exemplary embodiments of the disclosed subject matter.

Reference is made to FIG. 3A which shows an exemplary illustration of a plurality of feature vectors data structure according to exemplary embodiments of the disclosed subject matter. The plurality of feature vectors data structure relates to the output of keywords feature extraction step 204 of FIG. 2. As shown, the plurality of feature vectors may include N vectors. Each of the feature vectors 300, 302 and 304 may represent one keyword. Each feature vector, representing one keyword, may comprise the keyword's contextual words and their PMI score with the keyword. Contextual words and PMI fields 310, 312 and 314 represent contextual words of one keyword and their PMI scores with the target. Contextual words are words that are found within a limited distance apart from the keyword in the collection of textual transcripts. Thus, not all the keywords have the same number of context words. For practical reasons, the size of all of the feature vectors is preferably equal. Therefore the contextual words of each feature vector are the list of all of the keywords extracted on keywords extraction step 202. Words that are not contextual words of the keyword are marked by assigning them a PMI score of zero. For example, field 312 represents the word "paper" which has a PMI score of zero with the keyword and field 310 represents the word "cancel" which has a PMI score of 0.9 with the keyword.

Figure 3B:
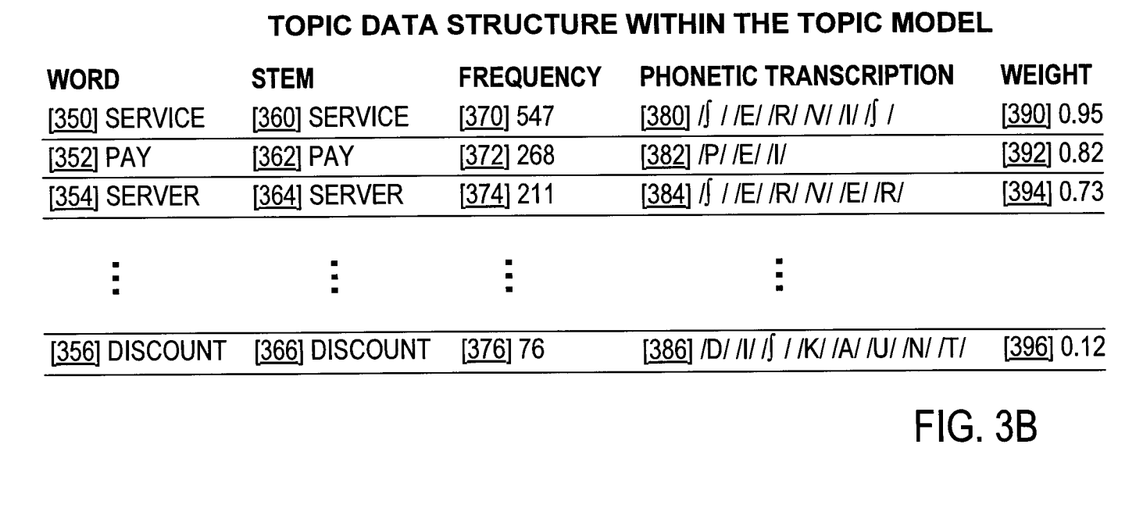
FIG. 3B shows an exemplary illustration of a data structure of a topic which is part of the topic model according to exemplary embodiments of the disclosed subject matter.

Reference is made to FIG. 3B which shows an exemplary illustration of a data structure of a topic which is part of the topic model according to exemplary embodiments of the disclosed subject matter. The topic model may be generated on steps 206, 208, 210 and 212 of FIG. 2 and stored on step 214 of FIG. 2.

Keyword fields 350, 352, 354 and 356 represent the list of keywords that constitute the topic. It is shown that the words "service" and "server" are included in the list of keywords that constitute the topic. Stem fields 360, 362, 364 and 366 represent the stem forms of the keywords 350, 352, 354 and 356 respectively. The stem forms are generated on step 210 of FIG. 2. Frequency fields 370, 372, 374 and 376 represent the frequency of the keywords 350, 352, 354 and 356 respectively. The keyword frequencies are produced on step 212 of FIG. 2. Phonetic Transcription fields 380, 382, 384 and 386 represent the phonetic transcription of the keywords 350, 352, 354 and 356 respectively. The phonetic transcriptions are extracted on step 208 of FIG. 2. Weight fields 390, 392, 394 and 396 represent the weights of the keywords 350, 352, 354 and 356 respectively, within the topic. The weights are produced on step 206 of FIG. 2.

Figure 4:
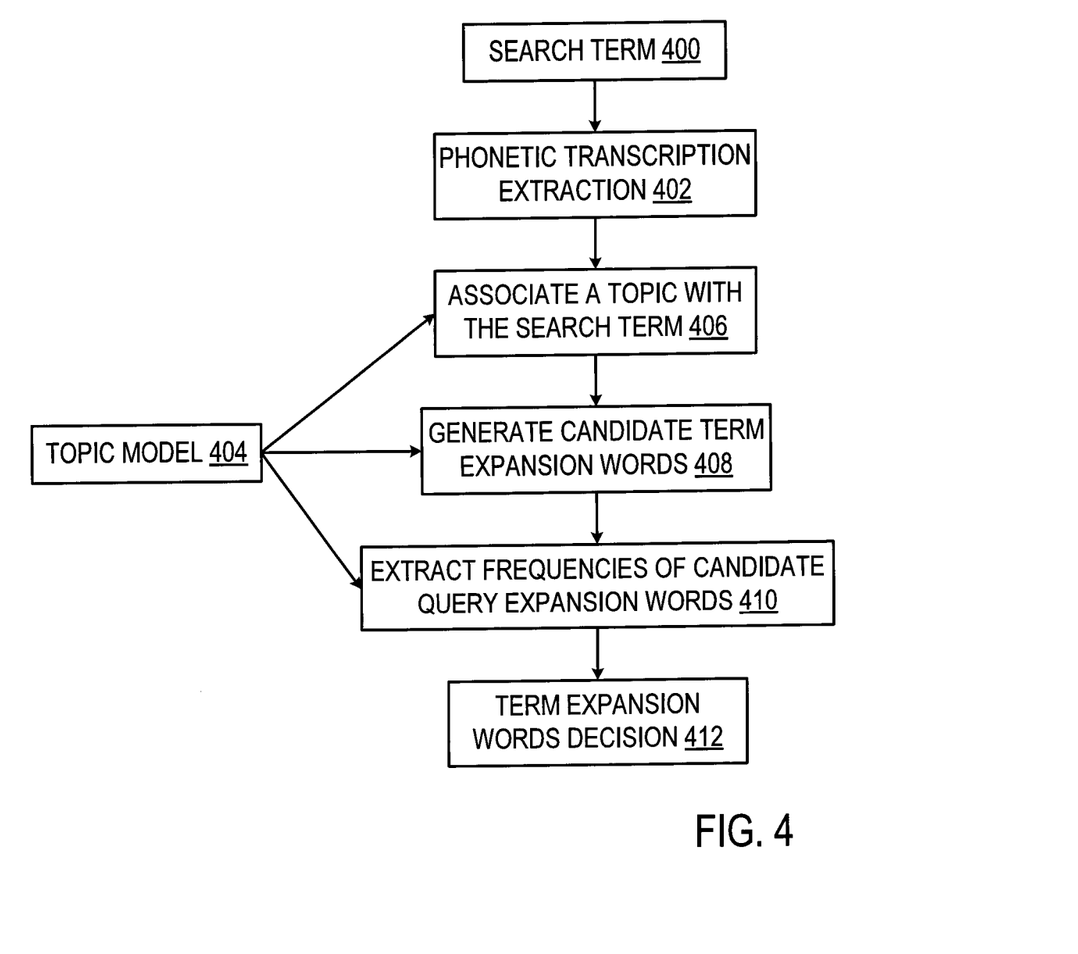
FIG. 4 shows a method for search term expansion according to exemplary embodiments of the disclosed subject matter.

Reference is made to FIG. 4 which shows a method for search term expansion according to exemplary embodiments of the disclosed subject matter. The embodiment shown in FIG. 4 may be carried out by component such as search term expansion component 142 of FIG. 1. The search term expansion aim is to improve the quality, in terms of precision and recall, of the retrieval of the textual transcripts. Each search term is expanded with a list of suggested terms. The search term expansion is based on searching for terms that are similar both phonetically and semantically to the search term. Terms that are similar both phonetically and semantically to the search term are highly probable to be substitution errors of the search term. The substitution errors are generated by the LVCSR component. Examples for such substitution errors may be the words "counsel" and "council". These words are phonetically similar and may also be semantically similar to the word "cancel" in the collection of textual transcripts. Thus, "counsel" and "council" may appear in a textual transcript instead of the word "cancel" which was originally uttered by the speaker. Another example for substitution error may be the word "server". This word is phonetically similar and may also be semantically similar to the word "service" in the collection of textual transcripts. Detecting this substitution error and expanding the search of the term "service" with the term "server" may improve the recall of the textual transcripts retrieval.

Phonetic similarity detection may be based on comparing the phonetic transcription of the search term with the phonetic transcriptions of other words. Semantic similarity detection may be based on detecting the different topics discussed in a collection of textual transcripts. Semantic similarity between words may be deduced if the words belong to the same topic. For example, if the words "counsel" and "council" belong to the same topic as the word "cancel", then they are semantically similar in the collection of textual transcripts. The search term expansion component uses the topic models in order to detect terms (words/phrases) that are semantically and phonetically similar and thus may appear as substitution errors of the search term.

Step 400 discloses obtaining a search term. The search term is a word or a phrase that constitute all of part of a search query that is used by search query component 140 of FIG. 1 in order to search and retrieve textual transcripts from textual transcripts repository such as textual transcripts repository 136 of FIG. 1.

Step 402 discloses extracting the phonetic transcription of the search term. The phonetic transcription is extracted similarly to the phonetic transcription extraction of the keywords at step 208 of FIG. 2.

Step 404 discloses obtaining the topic model that is stored on step 214 of FIG. 2. The topic model consists of a plurality of topics. Each topic comprises a list of keywords along with their phonetic transcriptions, their stem forms, their keyword frequencies and their weights in the topic.

Step 406 discloses associating a topic with the search term. The search term topic association is performed by detecting keywords on the lists of keywords that constitute the topics of the topic model that are similar to the search term. Upon detecting the search term in one of the lists of keywords, the relevant topic is associated with the search term. In case that the search term is detected in more than one topic than the frequencies of the search term within each topic are compared. The search term is associated with the topic that comprises the keyword with the highest frequency. In other embodiments, in case that the search term is detected in more than one topic than the weights of the detected keywords within each topic are obtained from the topic model and compared. The search term is associated with the topic that comprises the keyword with the highest weight.

Step 408 discloses generating candidate term expansion words list. The generation of candidate term expansion words list is performed by selecting from the list of keywords within the topic, that are phonetically similar to the search term. The detection of phonetically similar keywords is performed by comparing the phonetic transcription of the search term with the phonetic transcriptions of the keywords that constitute the topic. The phonetic transcriptions of the keywords are part of the topic model 404. The comparison between the phonetic transcription of the search term and the phonetic transcription of a keyword may be generated, for example, using Levenshtein Distance. Levenshtein Distance is a method for measuring the difference between two sequences. It is used in this application for measuring the difference between two phonetic sequences. The comparison produces a similarity score that represents the phonetic distance between the two phonetic transcriptions. The distance between two phonetic sequences takes into account three types of errors: insertion error, deletion error and substitution error. For example the difference between the phonetic transcription of the word 'cancel'—/k/ /a/ /n/ /ʃ/ /e/ /l/ and the phonetic transcription of the word 'council'—/k/ /a/ /u/ /n/ /ʃ/ /i/ /l/ is two. This difference is composed of one insertion error—the phoneme /u/ is added to the word 'council' and one substitution error—the phoneme /i/ in the word 'council' instead of phoneme /e/ the word 'cancel. The similarity score may be normalized to be in the range of zero to one, where zero represents low phonetic similarity between the search term and the keyword and one represents high phonetic similarity between the search term and the keyword. The candidate term expansion words may be the keywords that produced phonetic similarity with the search term that is higher than a predefined similarity threshold. A typical similarity threshold may be 0.8.

Step 410 discloses extracting the frequency of each candidate term expansion word in the corpus. In order to extract the frequency of each candidate term expansion word, the stem form of the candidate term expansion word is extracted from the topic model. A list of all the words, within the topic, that share the same stem form as the candidate term expansion word is generated. The frequencies in the corpus of the words on this list are summed. The summation is set to be the frequency of the candidate term expansion word. The keywords stem forms are produced in step 210 of FIG. 2 and the keywords frequencies are produced at step 212 of FIG. 2.

Step 412 discloses generating term expansion words list. The term expansion words list is generated by selecting words from the candidate term expansion words list. The words selection is based on the frequency of each candidate term expansion word. Candidate term expansion words that are less frequent than the search term are selected as term expansion words, whereas candidate term expansion words that are more frequent than the search term are not selected. The selected term expansion words are used to expand the search term. The decision may be performed by using the following formula:

$$D(CTEW_i) = \begin{cases} 1 & \text{if}(Freq(ST) \geq Freq(CTEW_i)) \\ 0 & \text{otherwise} \end{cases}$$

Wherein: $CTEW_i$ may represent the i-th candidate term expansion word;
$D(CTEW_i)$ may represent the decision regarding the i-th candidate term expansion word, wherein a decision value of 1 represents the decision to select the i-th candidate term expansion word as a term expansion word and a decision value of 0 represents the decision not to select it;
$Freq(ST)$ may represent the frequency of the search term; and $Freq(CTEW_i)$ may represent the frequency of the i-th candidate term expansion word.

The search term expansion is performed by adding the term expansion words to the search query. The addition of the term expansion words may be by using logical operators such as OR operators between the search term and the term expansion words. The search may be performed on a collection of textual transcripts which is different than the training data 200 of FIG. 2.

What is claimed is:

1. A method for expansion of search queries on large vocabulary continuous speech recognition transcripts comprising:
    obtaining a textual transcript of audio interaction generated by the large vocabulary continuous speech recognition;
    generating a topic model from the textual transcripts; said topic model comprises a plurality of topics wherein each topic of the plurality of topics comprises a list of keywords;
    obtaining a search term;
    associating a topic from the topic model with the search term; and
    generating a list of candidate term expansion words by selecting keywords from the list of keywords of the associated topic; said candidate term expansion words are of high probability to be substitution errors of the search term that are generated by the large vocabulary continuous speech recognition.

2. The method according to claim 1 further comprises extracting a phonetic transcription of the search term.

3. The method according to claim 1 further comprises detecting the frequency of the search term in the textual transcripts.

4. The method according to claim 1 further comprises extracting phonetic transcriptions of the keywords on the list of keywords.

5. The method according to claim 1 further comprises extracting the stem form of the keywords on the list of keywords.

6. The method according to claim 1 further comprises detecting the frequency of the keywords on the list of keywords by counting the number of appearances of the keywords in the textual transcripts.

7. The method according to claim 1 wherein associating a topic from the topic model with the search term is performed by detecting keywords on the lists of keywords that are similar to the search term.

8. The method according to claim 7 wherein more than one keyword is detected along with a frequency of the detected keywords within each topic and wherein the search term is associated with the topic that comprises the detected keyword with the highest frequency.

9. The method according to claim 7 wherein more than one keyword is detected along with a weight of the detected keywords within each topic and wherein the search term is associated with the topic that comprises the detected keyword with the highest weight.

10. The method according to claim 1 wherein generating the list of candidate term expansion words is based on detecting phonetic similarities between the search term and the keywords within the associated topic.

11. The method according to claim 10 wherein the detection of the phonetic similarities comprises:
    comparing between the phonetic transcription of the search term and the phonetic transcriptions of the keywords within the associated topic;
    producing similarity scores; and
    comparing between the similarity scores and a predefined similarity threshold.

12. The method according to claim 11 further comprises generating a list of term expansion words by selecting words from the list of candidate term expansion words.

13. The method according to claim 12 wherein selecting the words from the list of candidate term expansion words is performed by comparing between the frequencies of the words on the list of term expansion words and the frequency of the search term.

14. The method according to claim 13 wherein the frequency of a word on the list of term expansion words is the summation of all the frequencies of keywords within the associated topic that share the same stem form as the word on the list of term expansion words.

15. The method according to claim 12 further comprises expanding the search term by adding the term expansion words on the term expansion words list to the search term by using logical operators between the search term and the words on the term expansion words list.

* * * * *